April 13, 1937.    M. KNOBEL    2,077,115
CHRONOLOGICAL INSTRUMENT
Filed Oct. 31, 1936
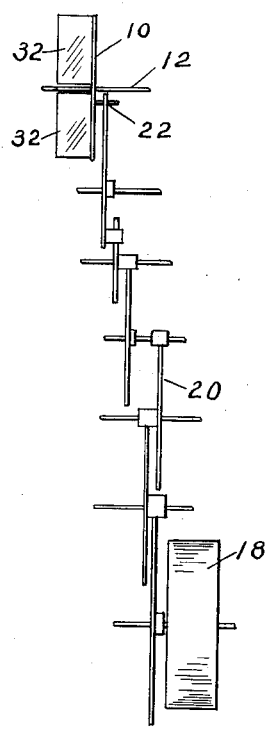
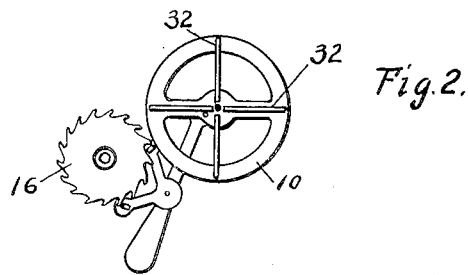
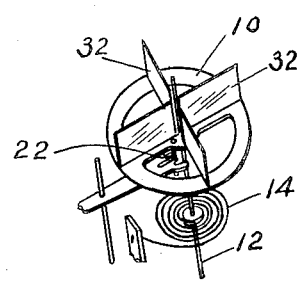
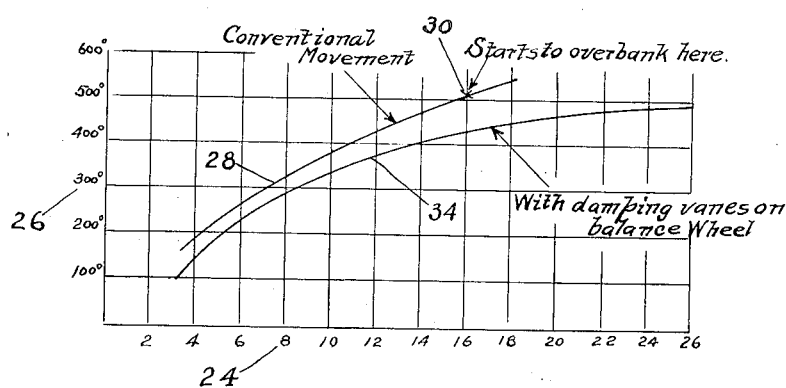
Inventor
Max Knobel
By Kenway & Witter
Attorneys Patented Apr. 13, 1937

2,077,115

UNITED STATES PATENT OFFICE 2,077,115

CHRONOLOGICAL INSTRUMENT

Max Knobel, Arlington, Mass.

Application October 31, 1936, Serial No. 108,580

3 Claims. (Cl. 58—117)

This invention relates to chronological instruments, including watches, clocks and the like, and the object of the invention is so to improve the control of the regulating function thereof that "overbanking" is eliminated, thereby (1) improving the timekeeping qualities of the instruments, (2) permitting the use of stronger main springs, (3) eliminating the losses now resulting to manufacturers due to overbanking in the instruments as manufactured, etc.

Chronological instruments are commonly driven by some power means, such as a weight or a main spring, and the movement is regulated or controlled by an oscillatory element kept in motion by the power means. Another force, such as gravity or the so-called hair spring, acts on the oscillatory element to regulate its speed and amplitude of oscillation. The regulating element is however quite sensitive to the amount of power delivered thereto and when such delivered power becomes excessive the oscillatory motion of the element is so increased that a rebounding thereof occurs at the ends of its oscillatory motion. This rebounding effect, commonly called "overbanking", causes a speeding up of the instrument and thus seriously affects its time-keeping qualities. It will be apparent that this objectionable effect places delicate requirements on the instrument since not only is the effect sensitive to the power of the main spring but also to the amount of friction in the driving train between such spring and the oscillatory element. Thus a serious limitation is placed on the main springs which can be used and variations which occur in the amount of friction in the train frequently cause the rejection of clocks which would otherwise be satisfactory. The object of my invention consists in so controlling the motion of the regulating element that overbanking is avoided and these various and several objections thereby eliminated.

I have discvovered that the application of one or more vanes to the regulating element, such as the balance wheel of a clock, has no detrimental effect on the oscillatory functioning of such element at normal speed but that any effort to increase the speed is resisted by such vanes with sufficient force to eliminate overbanking and the objectionable results enumerated. My invention therefore embodies the application of vanes or the like to chronological instruments for the purpose of eliminating the limitations and objections heretofore present in such instruments.

These and other features of the invention will be best understood and appreciated from the following description of a preferred embodiment thereof selected for purposes of illustration and shown in the accompanying drawing in which:—

Fig. 1 is a somewhat diagrammatic view of a train of mechanism employing my invention, Fig. 2 is a fragmentary front view of a portion thereof, Fig. 3 is a perspective view of the balance wheel and cooperating parts, Fig. 4 is a chart indicating the utility of my invention.

In the accompanying drawing I have illustrated my invention in connection with a spring driven clock mechanism, it being understood however that the scope of the invention is determined by the claims appended hereto rather than by the specific mechanism illustrated and described. The balance wheel 10 of this mechanism is mounted on a shaft 12 under the control of a hair spring 14. An escapement 16 driven from a main spring 18 through a gear train 20 acts on a pin 22 to oscillate the balance wheel in the well-known manner.

It is apparent that the impetus given to the balance wheel by the escapement will vary with the strength and tortional condition of the spring 18 and also with the amount of friction taken up in the train 20. The effect of increasing the power delivered to the escapement and balance wheel will be to increase the speed and amplitude of movement of the balance wheel. This effect is indicated in the chart shown in Fig. 4 wherein the various positions horizontally, indicated by the reference character 24, represent units of power delivered to the balance wheel and the various positions vertically, indicated by reference character 26, represent the amplitude of movement of the balance wheel.

The graph line 28 indicates the movement of the balance wheel in the conventional clock now in use. It is apparent that the amplitude of balance wheel movement rises quite uniformly with the increase of power delivered thereto. When the amplitude reaches the position $x$, indicated by reference character 30, the overbanking effect, above referred to, begins and continues to increase with the increase of power delivered. The result of this condition, as has already been described, is so to increase the speed of the clock as to render it unsuitable for timekeeping purposes.

The object of my invention is to keep the balance wheel from reaching an amplitude of oscillation substantially approximating and above the overbanking point x, indicated at 30. I accomplish this object by applying one or more vanes 32 to the balance wheel in such position that the broad surfaces thereof catch the air and thereby limit the oscillatory speed and amplitude of the wheel. The vanes do not detrimentally affect the movement of the wheel at normal speeds but when the applied power is sufficient to speed up the movement the damping effect of the vanes holds the speed and amplitude down to a point well below that at which overbanking would occur.

The accompanying chart, Fig. 4, represents the results actually obtained on the same clock before and after the application of the vanes 32 thereto. It will be noted that the vanes damp the oscillatory movement of the balance wheel at all speeds, as indicated by the graph line 34 below the line 28, and that without the vanes the amplitude of movement increases uniformly and rapidly with increase of power whereas with the vanes the increase of amplitude with increase of power continuously drops off as the power increases. Furthermore, when the power reaches a point substantially at the extreme right hand end of the graph line 34, this line becomes substantially flat, thus indicating a substantially fixed amplitude below the point x, indicated at 30, where overbanking begins. It is therefore apparent that the employment of vanes in accordance with my invention as herein disclosed not only removes the objectionable variations in the movement, but, furthermore, that such employment eliminates the delicate requirements heretofore present, permits the use of stronger and longer main springs, and eliminates the loss heretofore occasioned by the clocks which the manufacturer is required to discard because of inaccuracies of movement thereof due to overbanking.

Having thus described my invention, what I claim as new and desire to secure by Letters Patent of the United States is:—

1. A chronological instrument comprising an oscillatory member, means for keeping the member in periodic oscillatory motion, and a substantially rigid vane carried by the member in position to catch the air against the broad surfaces thereof and thereby limit the speed and amplitude of such oscillation and prevent overbanking at the ends of the oscillatory movement.

2. A chronological instrument comprising a balance wheel mounted for oscillatory movement about its supporting axis, means including a spring for keeping the wheel in periodic oscillatory motion about said axis, and a substantially rigid vane carried by the wheel in position to catch the air against the broad surfaces thereof and thereby limit the speed and amplitude of said oscillation and prevent overbanking at the ends of the oscillatory movement.

3. A time keeping mechanism comprising a main spring, an escapement mechanism, a gear train from the spring to said mechanism, a balance wheel, the escapement mechanism being arranged to transmit rotative impulses to the balance wheel alternately in opposite directions, a spring cooperating with the balance wheel and escapement mechanism to continue the balance wheel in oscillation, and a plurality of vanes carried in radial position on the balance wheel, each vane being mounted on the wheel to remain substantially permanently in a plane passing through said axis.

MAX KNOBEL.